United States Patent
Mayer et al.

(10) Patent No.: US 11,562,079 B2
(45) Date of Patent: Jan. 24, 2023

(54) SYSTEM-ON-CHIP AND METHOD FOR OPERATING A SYSTEM-ON-CHIP

(71) Applicant: Infineon Technologies AG, Neubiberg (DE)

(72) Inventors: Albrecht Mayer, Deisenhofen (DE); Reinhard Deml, Munich (DE); Viola Rieger, Munich (DE); Alexander Zeh, Munich (DE)

(73) Assignee: Infineon Technologies AG, Neubiberg (DE)

( * ) Notice: Subject to any disclaimer, the term of this patent is extended or adjusted under 35 U.S.C. 154(b) by 556 days.

(21) Appl. No.: 16/662,271

(22) Filed: Oct. 24, 2019

(65) Prior Publication Data

US 2020/0143064 A1    May 7, 2020

(30) Foreign Application Priority Data

Nov. 1, 2018   (DE) .................... 10 2018 127 330.4

(51) Int. Cl.
*G06F 21/00* (2013.01)
*G06F 21/60* (2013.01)
(Continued)

(52) U.S. Cl.
CPC ........ *G06F 21/602* (2013.01); *G06F 11/2236* (2013.01); *G06F 11/27* (2013.01);
(Continued)

(58) Field of Classification Search
CPC ...... G06F 21/62; G06F 21/53; G06F 15/7807; G06F 12/1466; G06F 11/27; G06F 11/2236; G06F 21/602
(Continued)

(56) References Cited

U.S. PATENT DOCUMENTS

| 8,356,361 B2 * | 1/2013 | Werner ............... G06F 12/1433 709/225 |
| 2007/0040678 A1 * | 2/2007 | Kojo .................. G08B 13/1436 340/568.1 |

(Continued)

FOREIGN PATENT DOCUMENTS

| DE | 10056989 A1 | 5/2002 |
| DE | 10200902767 A1 | 1/2011 |

OTHER PUBLICATIONS

Riessland, Heiko et al; "Three Current On-Chip Trace Methods Compared"; elektroniknet.de; Nov. 14, 2007.

*Primary Examiner* — Josnel Jeudy
(74) *Attorney, Agent, or Firm* — Eschweiler & Potashnik, LLC

(57) ABSTRACT

In different example embodiments, a system-on-chip is provided. The system-on-chip can have a control circuit with a plurality of control circuit areas, wherein the control circuit is configured to control a device, a security circuit which has a separately secured key memory and a hardware accelerator for cryptographic operations, wherein the security circuit is configured to electively enable either a read-only access or a read and write access to at least one of the control circuit areas, wherein the security circuit is furthermore configured to provide a communication path by means of the key memory and the hardware accelerator for the secured communication with a diagnostic system disposed outside the security circuit, to make the selection between the read access and the read and write access to the at least one selected area of the control circuit depending on a certificate supplied to the security circuit and authenticated by means of information stored in the key memory, and to execute the read access or the read and write access.

21 Claims, 5 Drawing Sheets

(51) Int. Cl.
  *G06F 21/62* (2013.01)
  *G06F 21/53* (2013.01)
  *G06F 15/78* (2006.01)
  *G06F 11/27* (2006.01)
  *G06F 11/22* (2006.01)
  *G06F 12/14* (2006.01)

(52) U.S. Cl.
  CPC ...... *G06F 12/1466* (2013.01); *G06F 15/7807* (2013.01); *G06F 21/53* (2013.01); *G06F 21/62* (2013.01)

(58) Field of Classification Search
  USPC .......................................................... 726/26
  See application file for complete search history.

(56) References Cited

U.S. PATENT DOCUMENTS

| | | | |
|---|---|---|---|
| 2008/0082828 A1* | 4/2008 | Jennings | G06F 21/72 726/17 |
| 2015/0324583 A1 | 11/2015 | Emele | |
| 2016/0132444 A1* | 5/2016 | Jaraudias | H04L 12/413 710/308 |
| 2016/0259584 A1 | 9/2016 | Schlottmann | |
| 2018/0077142 A1* | 3/2018 | Thakkar | H04L 63/0807 |
| 2019/0050601 A1 | 2/2019 | Zeh | |
| 2019/0132136 A1* | 5/2019 | Scarlata | G06F 21/606 |
| 2021/0034788 A1* | 2/2021 | Savagaonkar | H04L 63/0428 |
| 2021/0152531 A1* | 5/2021 | Pan | H04L 63/0428 |
| 2021/0211281 A1* | 7/2021 | Park | G06F 21/74 |

\* cited by examiner

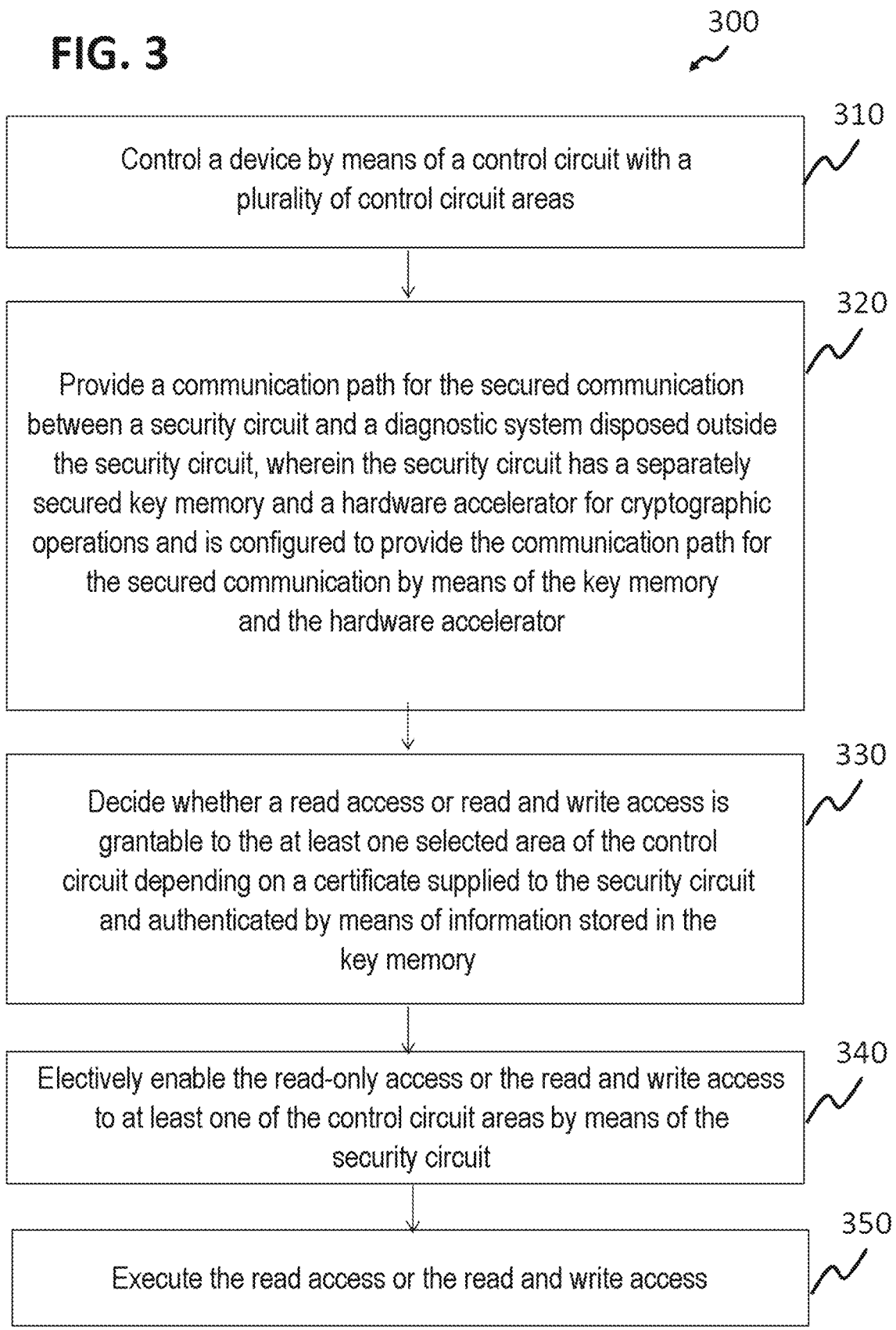

SYSTEM-ON-CHIP AND METHOD FOR OPERATING A SYSTEM-ON-CHIP

REFERENCE TO RELATED APPLICATION

This Application claims priority to German Application No. 10 2018 127 330.4, filed on Nov. 1, 2018, the contents of which are hereby incorporated by reference in their entirety.

FIELD

The disclosure relates to a system-on-chip (SoC) and a method for operating a system-on-chip.

BACKGROUND

Multicore microcontrollers, also referred to as a system-on-chip, enable the control or regulation of (operational-) safety-critical (real-time) hardware systems.

The German term "Sicherheit" and related terms (as above "sicherheitskritisch") are used in two different contexts which are distinguished in English by means of the terms "safety" or "security". "Safety" refers here to operational safety, i.e. a system is operated in a state in which its use causes damage to neither the system nor its environment (e.g. a user). "Security", on the other hand, refers to data security, i.e. access to data and/or functions which are providable or executable by a system enabled for access-authorized parties only. In order to make a distinction, the terms "security" and terms derived therefrom, such as "secure", etc., and "data security" are used herein for data security, and the terms "safety" (and terms derived therefrom, such as "safe", etc.) and "operational safety" are used for operational safety. Unless otherwise indicated by the context, the German term "Sicherheit" (without further differentiation) means both operational safety and data security.

The complex systems described above can have an essentially unrestricted input (value) space and state space. It can therefore arise that specific anomalies (e.g. states which deviate from expected, wanted states and also from foreseen, unwanted states) occur only in the field, i.e. during operation by the user. This type of anomaly can have its cause in unexpected input values and/or in attacks on the data security of the system and can have an impact on the availability of the system.

This means that a requirement exists to enable a facility for flexible access to such complex systems during their operation by the user which guarantees the data security (and also the operational safety) of the system in order to detect anomalies (and possibly their causes).

In some of the systems currently available, (operational) software can have a diagnostic and logbook function. However, only those anomalies or malfunctions which have been expected from the outset are typically detected therewith. In one application of a diagnostic tool of this type, a specific system, e.g. a passenger vehicle, which has shown an anomaly can subsequently be equipped with error detection or error correction facilities (also referred to as a debug function), e.g. can be connected to a diagnostic unit. However, the error detection or error correction facilities will result in success at most if the anomaly is simple to reproduce and is not affected by modification of the system as a result of the connection of the diagnostic unit. However, in an approach of this type, the possibility exists that it is in any case accessible only during a development phase, and not when the system is already in the possession of the user.

A further presently available system-on-chip 100 with a debug facility for a host system 102 integrated therein is shown in FIG. 1A to FIG. 1C. Here, FIG. 1A shows an overview of the entire system-on-chip 100 and a debug device 104 connected thereto, and FIG. 1B and FIG. 1C show two examples of how the debug access in the host system 102 can be designed.

The system-on-chip 100 provides an access channel ("debug channel") which is protected (in terms of data security) to a host system 102.

In order to set up the authenticated debug channel, the system-on-chip 100 uses a hardware security module (HSM) 112. The HSM 112 forms a module physically separated from the host system 102 with data security modules, such as e.g. a security processor 118 referred to as a "secure CPU", a ROM library 114 referred to as a "crypto-cell", a debug control unit (DCU) 116, an interface 110, a boot ROM 112 and a secured data memory ("secured RAM") 120.

The ROM library 114 is used to check (debug) certificates 108 which are fed to the HSM 112 from the external debug device 104 by means of a debug access port (DAP) 106 and by means of the interface 110. In order to ensure that the debug certificate can be used for authentication in the present SoC 100 only, it may be necessary to sign the debug certificate with the secret SoC-specific key which is stored in an unalterably programmed OTP-RAM 124 on the chip.

With or after the forwarding of the (debug) certificate 108, the external debug device 104 can transmit debug instructions to the host system (e.g. by means of the debug access port 106), e.g. to a (debug) access port 132, 132D (not shown in FIG. 1A, it is located where a switch 126 is shown as a safe when the host system 102 is accessed; the (debug) access port 132, 132D is shown in FIG. 1B).

However, the (debug) access port 132, 132D remains locked (by means of the switch 126) until the (debug) certificate 108 has been authenticated in the HSM 112. After the authentication, the DCU 116 which is configured to control and implement access to debug interfaces (e.g. debug access ports 132, 132D of host CPUs 128 and other system resources 130, 140, 142) in order to unlock the (debug) access port 132, 132D (or possibly in each case a debug access port 132, 132D to a host CPU 138 and to a host memory 142).

After the opening of the debug access port 132, 132D to the host system 102, the debug instructions forwarded from the external debug device 104 can be executed in the host system 102.

It is provided here that the debug instructions which are forwarded by means of the debug access ports 132, 132D are forwarded e.g. with a protocol compliant with the JTAG standard.

The execution of the debug instructions (as a debug protocol) in the host system 102 can, for example as shown in FIG. 1B, be performed by means of components specifically provided for the debugging. The components intended specifically for this purpose may, for example, have a physical USB connection 132D, a USB device controller 134D and a module with standard instructions 136. This configuration offers the advantage that it intervenes at least in the remaining system which is configured for the operation of a device (in particular the associated physical USB connection 132, the USB device controller 134 and the CPU(s) 128) and provides debug facilities even if the remaining system is (e.g. still or again) in a "bare-metal" state, i.e. e.g. no software is yet installed there. However, the expensive additional components intended specifically for this purpose (e.g. the physical USB connection 132D, the USB device controller 134D and the module with standard instructions 136) must then be provided.

In a lower-cost example, the debug instructions can be executed (as a debug protocol) in the host system 102, for example as shown in FIG. 1C, by means of the components configured to operate a device. This means that, for example, the physical USB connection 132, the USB device controller 134 and CPU 128 which are configured to operate the device are simultaneously also configured to execute the debug protocol. This is, on the one hand, invasive and, on the other hand, requires the CPU 128 to be running, since the debug functionality also disappears simultaneously with the stoppage of the CPU 128 (which may possibly be necessary during a debugging).

A need accordingly exists to provide a system-on-chip which, on the one hand, requires no additional components and is therefore economical, but, on the other hand, is nevertheless capable of stopping all CPUs used to control/operate the device if required without losing the debug functionality.

A further aspect of the system-on-chip 100 from FIG. 1A to FIG. 1C relates to the opening of the debug ports 132, 132D by means of the DCU 116. The opening of the debug ports 132, 132D can be vividly described as a flipping (opening) of a main switch which activates all debug systems or functionalities accessible in the system in accordance with the JTAG standard.

As long as a debugging of this type is performed before the device (including the SoC 100) is supplied to a user, i.e., for example, by the manufacturer, a design of this type can be unproblematic.

If, however, as outlined above, the intention is to monitor the device or the SoC 100 during an operation (i.e. by the user) in order to detect anomalous processes, it may be problematic that the debug facility provides not only monitoring functions, but simultaneously also e.g. the facility to set breakpoints. The device may, for example, be an engine control unit of a passenger vehicle, and software deactivated in an uncontrolled manner during a journey by means of an external debug access can cause the engine to fail and therefore create a situation that is dangerous for the user and/or third parties.

SUMMARY

It may accordingly be desirable to provide a system-on-chip which enables an unlocking of different debug levels, at least one of which enables a monitoring of the device or the system-on-chip during the operation of the device and simultaneously ensures the operational safety of the device.

In different example embodiments, debug resources are controlled by means of a hardware and software unit integrated into a system-on-chip which recognizes a special rights level of a tool (e.g. a diagnostic system) on the basis of a key, password and/or certificate which is provided for an authentication of the tool. Intervention/interaction or observation are permitted (or prohibited) on the basis of the special rights level. A predefined special rights level can mean, for example, that only activities of a specific virtual machine can be tracked. The tracking can be or can become enabled, for example with different observation points (e.g. times or locations in a program sequence).

In different example embodiments, a system and method are provided for monitoring a control system (e.g. a control system of a device) in a safe/secure but nevertheless flexible manner via remote access. The system or method provided is furthermore robust and economical.

In different example embodiments, a hardware security module of the control system is used for the monitoring, said module being particularly suitable since it represents a secure environment and is independent from the remainder of the system (e.g. due to dedicated system peripherals and memory). Some fundamental operational-safety-related aspects can also already be provided by the security subsystem without further modifications.

It may furthermore be possible in many cases that the hardware security module is not fully utilized by the typical security tasks. This may be the case particularly during a development phase. It may be possible during development that the security function is not required at all or is required to a very limited extent only. The diagnostic function, in particular the communication path, can advantageously be provided accordingly without additional expensive hardware.

The HSM is furthermore an independent subsystem in one embodiment, which means that it maintains the communication with the diagnostic system even if the (normal multicore) control system is or becomes stopped.

In different example embodiments, a system-on-chip is provided. The system-on-chip can have a control circuit with a plurality of control circuit areas, wherein the control circuit is configured to control a device, a security circuit which has a separately secured key memory and at least one hardware accelerator for cryptographic operations, wherein the security circuit is configured to electively enable either a read-only access or a read and write access to at least one of the control circuit areas, wherein the security circuit is furthermore configured to provide a communication path by means of the key memory and the at least one hardware accelerator for the secured communication with a diagnostic system disposed outside the security circuit, to make the selection between the read access and the read and write access to the at least one selected area of the control circuit depending on a certificate supplied to the security circuit and authenticated by means of information stored in the key memory, and to execute the read access or the read and write access.

The read access or read and write access to the at least one selected area of the control circuit can be designed in such a way that at least one diagnostic instruction forwarded from the diagnostic system by means of the communication path to the security circuit is executable therewith.

In one embodiment the security circuit can be configured by means of software to execute the secured communication.

In one embodiment the security circuit can have a CPU or a virtual machine which is configured to run the software.

In one embodiment the software can have a software communication stack, e.g. an Ethernet software communication stack.

In one embodiment the CPU or the virtual machine can be configured to support a plurality of master tags for access to the at least one selected area of the control circuit. It can thus be enabled to supply the diagnostic system with fewer or other access facilities than those which the CPU or the virtual machine in principle has at its disposal.

In different example embodiments, the communication path may entail a network. In different example embodiments, the network may at least partially entail a wireless data transmission.

In different embodiments, the at least one selected area of the control circuit can have a plurality of selected areas of the control circuit, and the security circuit can be configured to make the selection between the read access and the read and write access separately for each of the plurality of selected areas of the control circuit. In other words, a read (-only) access can be enabled to a first part (e.g. none, one or more) of the selected areas of the control circuit, and a read and write access can simultaneously be enabled to a second part (none, one or more) of the selected areas of the control circuit differing from the first part.

In different example embodiments, the security circuit can be configured to enable neither the read access nor the read and write access in the event of a failed authentication.

If necessary, in one embodiment the security circuit can furthermore be configured to trigger an alarm for example in the device, in the event of a failed authentication.

In different example embodiments, the security circuit can be configured to take account of at least one additional parameter in the selection between the read access and the read and write access. The additional parameter can relate, for example, to a relevance of the read access or read/write access for an operational safety of the device, an operational state of the device and/or a time of provision of the certificate.

The consideration of the relevance of the read access or read/write access for the operational safety of the device can mean that the security circuit is configured, in the selection between the read access and the read and write access (or the complete prohibition of access), to make a clear distinction between a debug instruction which may be critical for operational safety (e.g. "stop", "pause", etc.) and other debug instructions which have a monitoring function only (e.g. counting, tracking, etc.). The operational-safety-critical instructions may normally require a write access, whereas a read-only access may normally be sufficient for the monitoring functions. In some cases, for example during a readout of a (FIFO) memory which is automatically overwritten by the readout, the read-only access can also be categorized, if necessary, as operational-safety-critical.

The consideration of the operational state of the device can mean that the security circuit can be configured to completely prohibit the read and write access (or an operational-safety-critical read access) to all areas of the control circuit or at least to one or more of the selected areas of the control circuit if the device is in a first predefined operational state, and/or to enable read and write access (or an operational-safety-critical read access) to all areas of the control circuit or at least to one or more of the selected areas of the control circuit if the device is in a second predefined operational state.

The first predefined operational state may be an "active" operational state, in other words an operational state in which the device is active or in operation.

The first predefined operational state may be an "inactive" operational state, in other words an operational state in which the device is inactive or is not in operation or is in an idle/paused state.

The consideration of the time of provision of the certificate can enable the provision of certificates with a limited validity period.

The at least one selected area may be or may have a virtual machine and/or diagnostic hardware and/or debug hardware of the control circuit.

This system-on-chip can be configured to close the communication path following an instruction from the diagnostic system, the security circuit and/or the control circuit. The system-on-chip can furthermore be configured to perform a restart following the closure of the communication path.

BRIEF DESCRIPTION OF THE DRAWINGS

Example embodiments of the disclosure are shown in the figures and are explained in detail below.

FIG. 3 shows a flow diagram of a method for operating a system-on-chip according to different example embodiments.

DETAILED DESCRIPTION

Reference is made in the following detailed description to the attached drawings which form part of said description and in which specific embodiments in which the disclosure can be put into practice are shown by way of illustration. In this respect, the directional terminology such as e.g. "above", "below", "in front", "behind", "front", "rear", etc., are used with reference to the orientation of the described figure(s). Since components of embodiments can be positioned in a number of different orientations, the directional terminology is used for illustrative purposes and is in no way limiting. Other embodiments can obviously be used and structural or logical changes can be made without departing the protective scope of the present disclosure. The features of the different example embodiments described herein can obviously be combined with one another unless specifically otherwise indicated. The following detailed description is therefore not to be interpreted in a limiting sense, and the protective scope of the present disclosure is defined by the appended claims.

In the context of this description, the terms "linked", "connected", and "coupled" are used to describe both a direct and an indirect link, a direct or indirect connection and a direct or indirect coupling. Identical or similar elements are denoted with identical reference numbers in the figures, insofar as this is appropriate.

Figure 2A:
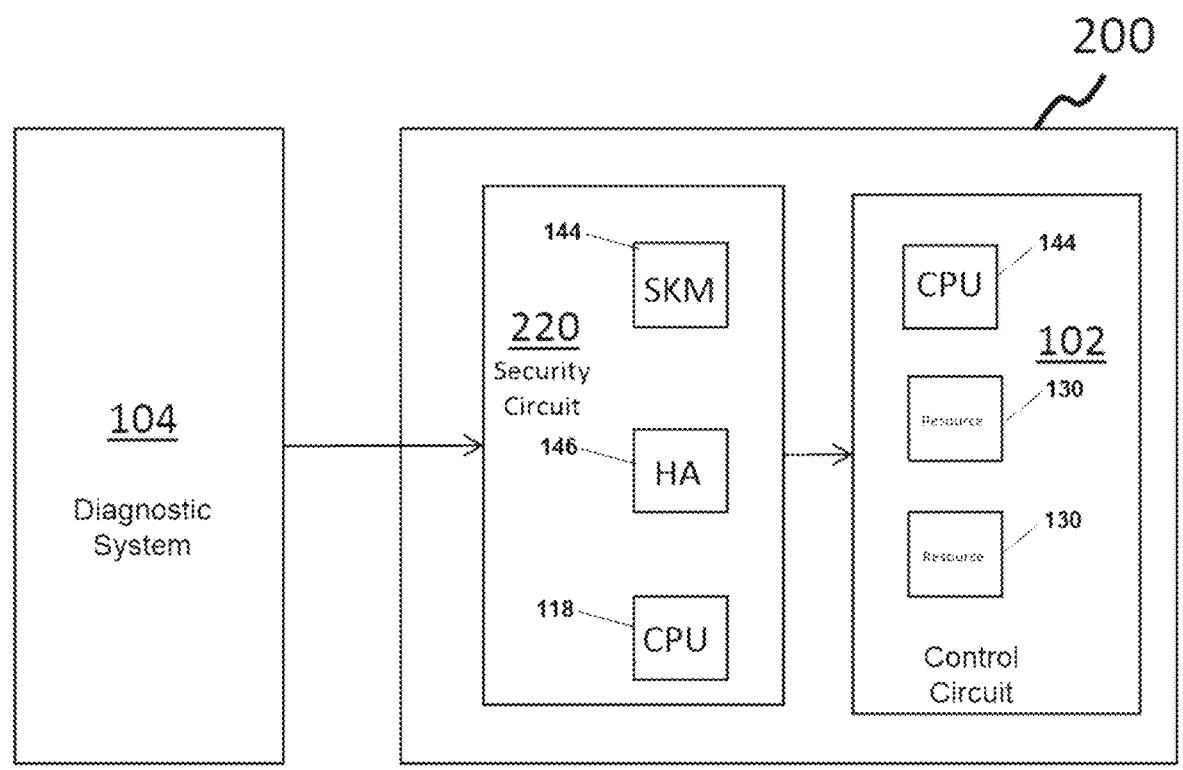
FIG. 2A and FIG. 2B in each case show a schematic overview of a system-on-chip according to different example embodiments.
Figure 2B:
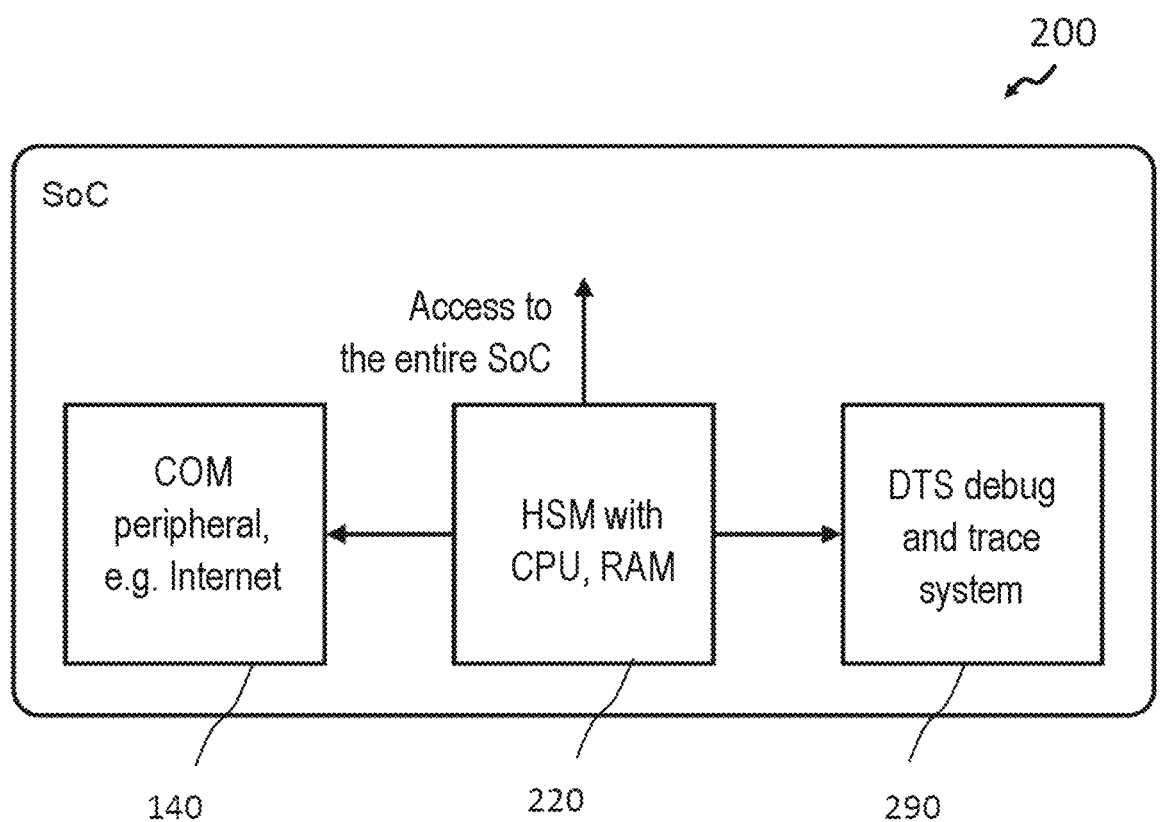

FIG. 2A and FIG. 2B in each case show a schematic overview of a system-on chip 200 according to different example embodiments.

As shown in FIG. 2A, the system-on-chip 200 can have a control circuit 102 with a plurality of control circuit areas 128, 130. The plurality of control circuit areas may be or may have, for example, a CPU 128 or other resource 130 of the control circuit 102, e.g. an interconnect 140, a memory 142 or other resources such as e.g. a virtual machine, diagnostic hardware and/or debug hardware of the control circuit (see the similar control circuits 102 from FIG. 1B and FIG. 1C). Each of the control circuit areas may, for example, be identifiable by its address area.

The control circuit 102 can be configured to control a device (not shown). The device may essentially be any device typically controlled or regulated by means of a control circuit 102, for example an engine of a vehicle or a machine, a medical device, a cash register system or similar.

The system-on-chip 200 can furthermore have a security circuit (also referred to as a cryptography security circuit or security circuit for short) 220. The security circuit 220 can be formed, for example, as a hardware security module (HSM) 220.

The term "secure" refers here to information security and not functional security/safety.

An HSM is a logically, sometimes also physically, separated hardware unit which guarantees an efficient and secure execution of cryptographic operations and security applications.

The security circuit 220 can be configured to supply the control circuit with (data-)security-related functions which may be required, for example, during the operation of the device. The security-related functions may entail, for example, a generation of random numbers, keys and PINs and/or an encryption and decryption of data.

In addition to a processor 118 (a CPU, here also referred to as a security CPU), the security circuit 220 can also have a separately secured key memory (SKM) 144 (to store cryptographic keys) and a hardware accelerator (HA) 146 for cryptographic operations (e.g. for hash functions and/or for symmetric and/or asymmetric cryptography) in order to perform the security-related functions.

The security circuit 220 can furthermore have a separate read/write access to dedicated resources, for example to CPUs and/or memories in the control circuit 102.

In different example embodiments, the security circuit 220 can furthermore be equipped with mechanisms to protect against side-channel attacks. Security standards (such as FIPS 140-1 or Common Criteria) specify criteria for the certification of HSMs.

Current applications for the HSM in the automotive environment are secure boot, secure data communication (via CAN, Ethernet and LIN) and memory protection (for IP security).

As explained above, it may be desirable or necessary to monitor the control circuit 102 and/or the device controlled by it, for example in the field.

A diagnostic system 104 can be or can become provided for this purpose.

An access authorization notification can be forwarded from the diagnostic system 104 to the security circuit 220 in order to provide a (secure) communication path between the diagnostic system 104 and the system-on-chip 200 which enables a secure (in the information technology sense) communication between the system-on-chip 200 (in particular the security circuit 220) and the diagnostic system 104.

The security circuit 220 can be configured to authenticate the access authorization notification by means of the key memory 144 and the hardware accelerator 146 and then to provide the (secure) communication path for the secured communication with the diagnostic system 104 disposed outside the security circuit 220 (and, if necessary, outside the system-on-chip 200 also).

The security circuit 220 can furthermore be configured to evaluate the access authorization notification in such a way that the access authorization notification enables a selection between different facilities for accessing the control circuit areas 128, 130 of the control circuit 102. The security circuit 220 can be configured, for example, either to enable (only) a read access or a read and write access to each of the control circuit areas 128, 130 or to prohibit access.

The access authorization notification authenticated by means of information stored in the key memory 144 (and, if necessary, by means of the hardware accelerator 146) can be matched, e.g. by means of the security CPU 118, with allocations of access authorization notifications stored in the security circuit 220 for access authorizations.

The security circuit 220 can be configured to enable the read access or the read and write access to the at least one selected area 128, 130 of the control circuit 102 on the basis of the allocated access authorization, or to prohibit access.

The security circuit 220 can be configured to execute the read access or the read and write access to the at least one selected area 128, 130 of the control circuit 102.

The read access or the read and write access to the at least one selected area 128, 130 of the control circuit 102 can be designed in such a way that at least one diagnostic instruction forwarded from the diagnostic system 104 by means of the communication path to the security circuit 220 is executable therewith.

Figure 1A:
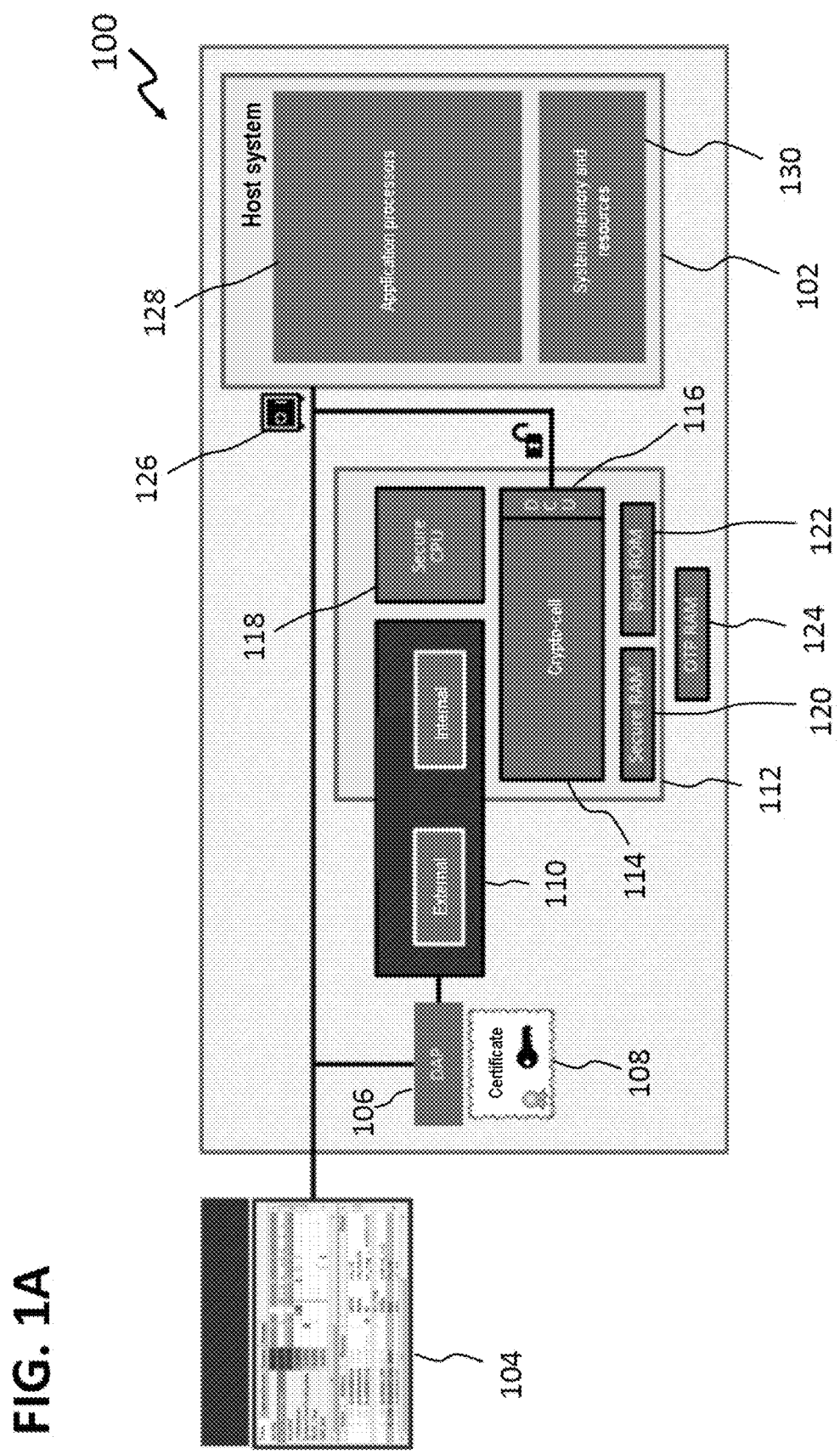
FIG. 1A shows a schematic overview of a system-on-chip according to the prior art and an external debug device connected thereto FIG. 1B and FIG. 1C in each case show a schematic representation of a host system of the system-on chip from FIG. 1A.
Figure 1B:
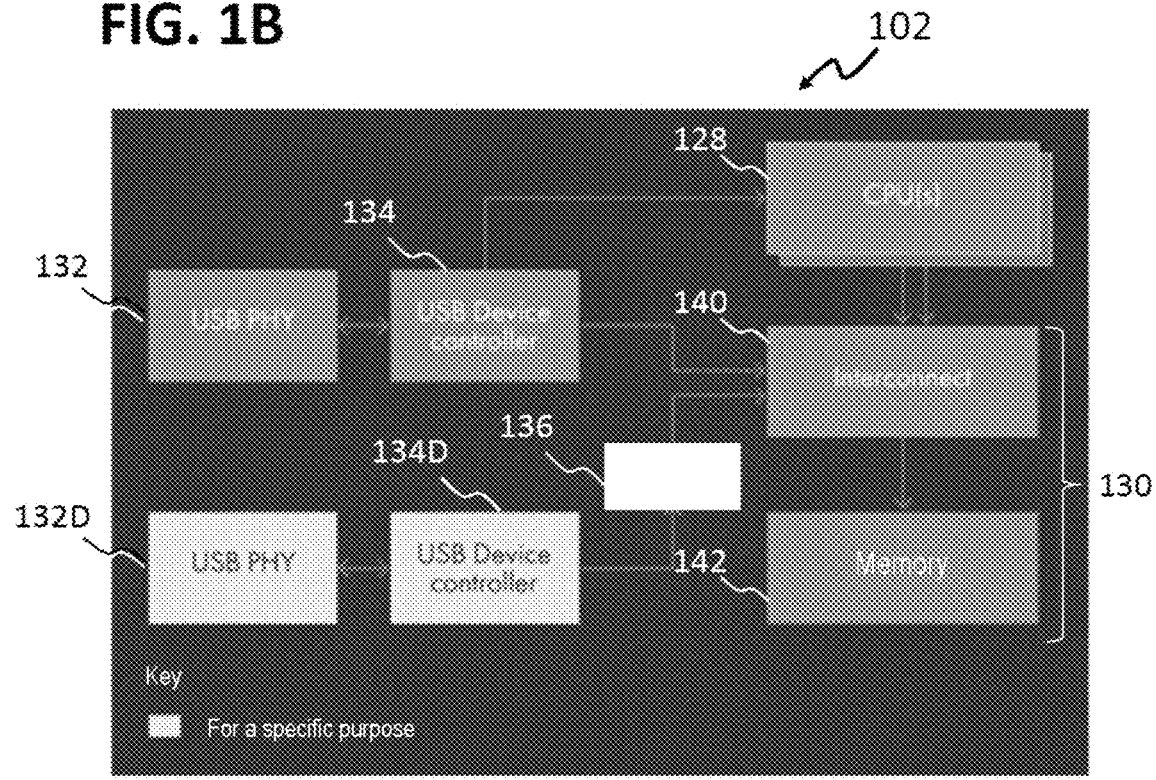
Figure 1C:
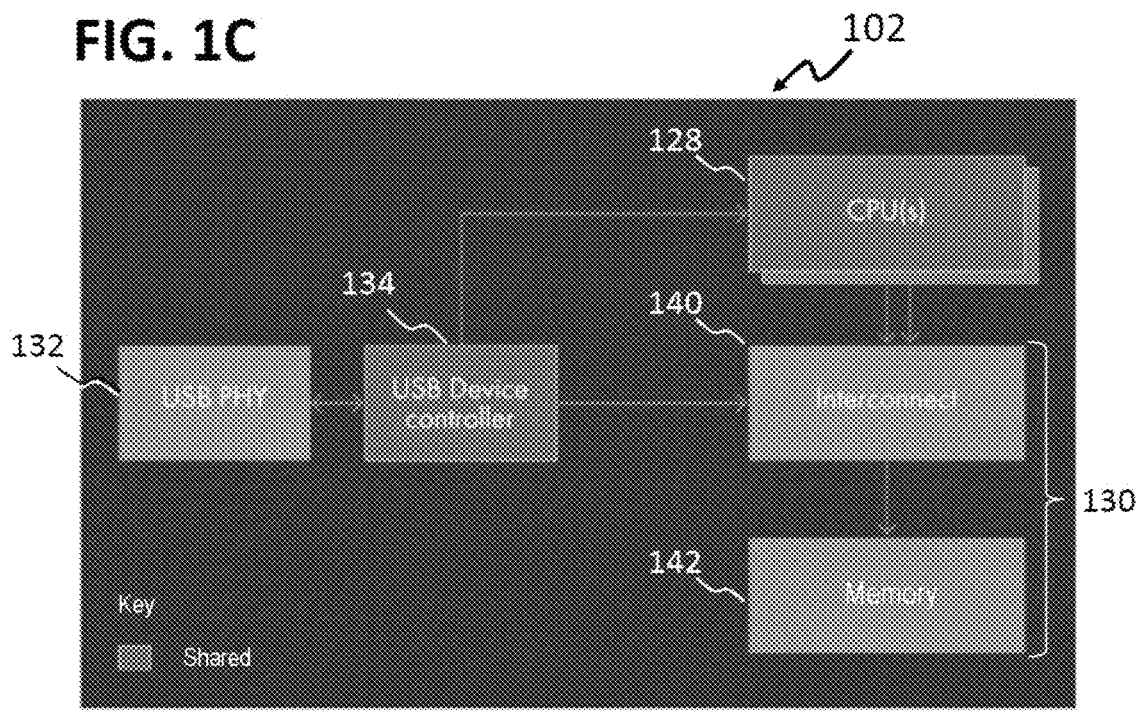

This means that, unlike the system-on-chip 100 explained in connection with FIGS. 1A to 1C in which the diagnostic or debug instructions and information are exchanged directly between the diagnostic system 104 and the host system 102 following the opening of the "switch" 126, in the system-on-chip 200 according to different example embodiments, the diagnostic system forwards its monitoring and/or debug instructions to the security circuit 220 and these instructions are forwarded from the security circuit 220 to the control circuit 102, taking account of the read access or read and write authorization for each control circuit area 128, 130 affected by the diagnostic instruction.

The security circuit 220 can be configured by means of software to perform the secured communication with the diagnostic system 104 and/or to supply the diagnostic instruction to the control circuit 102. The software may, for example, in each case have a software package to perform the secured communication with the diagnostic system 104 or to supply the diagnostic instruction to the control circuit 102.

In different example embodiments, the CPU 118 of the security circuit 220 or a virtual machine can be configured to run the software.

The (communication) software may, for example, have a software communication stack, e.g. an Ethernet software communication stack.

The CPU 118 or the virtual machine can be configured to support a plurality of master tags for access to the at least one selected area 128, 130 of the control circuit 102. It can thus be enabled to supply the diagnostic system with fewer or other access facilities than those which the CPU 118 or the virtual machine in principle has at its disposal.

This means that the security circuit 220 or the CPU (or the virtual machine) can be configured in principle to access each of the selected areas 128, 130 of the control circuit 102 by means of a write access, but the plurality of master tags are provided to restrict the access type to individual or all of the selected areas 128, 130 of the control circuit 102, e.g. to read-only access, or as an access prohibition.

As already described, the security authorization of accesses requested by the diagnostic system 104 is checked by the security circuit 220. The safety authorization for the resulting accesses to the control circuit 102 can then be checked by the master tags in the control circuit itself, and the control circuit 102 can thus protect itself against critical attacks. This is necessary, since it cannot be excluded that the security circuit 220, due to a hardware or software error, enables an unauthorized access which has critical consequences.

In order to enable a read access for a predefined master tag, the security circuit 220 can be configured to enter a value corresponding to a read access right in an access enable register at a location allocated to the master tag.

In order to enable a read and write access for a predefined further master tag, the security circuit 220 can similarly be configured to enter a value corresponding to a read and write access right in an access enable register at a location allocated to the further master tag.

In different example embodiments, this access control can in turn be secured by overwriting the access enable register in such a way that the overwrite is permissible only for a master which is designated by means of its master tag in such a way that it not only meets the information technology security requirements, but also ensures the operational safety of the device. In different embodiments, corresponding information can be transmitted, for example, as sideband or inband information in the bus system. These example embodiments are simple in design/implementation, but are relatively expensive, since the master (or the corresponding software) must meet both high (e.g. the highest) safety requirements and high (e.g. the highest) security requirements.

In different example embodiments, a safety CPU of the control circuit 102 can instead be configured (e.g. the CPU 128 or a further CPU can be configured as a safety CPU) in such a way that it locks (defines) the access authorizations in an initialization phase, e.g. as an allocation of master tag(s) to resource(s) 128, 130 which it/they is/are authorized to access. The security circuit 118 can be configured to check the access authorization in the modules that are relevant to it.

Both designs enable the provision of a system-on-chip with a locking which guarantees both operational safety and data security.

In different example embodiments, the communication path to the diagnostic system can entail a network. In different example embodiments, the network can entail at least partially a wireless data transmission.

In different example embodiments, the at least one selected area 128, 130 of the control circuit 102 can entail a plurality of selected areas of the control circuit.

The security circuit 220 can be configured to make a selection between the read access and the read and write access separately for each of the plurality of selected areas 128, 130 of the control circuit 102.

In other words, a read (-only) access can be enabled to a first part (e.g. none, one or more) of the selected areas 128, 130 of the control circuit 102, and a read and write access can simultaneously be enabled to a second part (none, one or more) of the selected areas 128, 130 of the control circuit 102 differing from the first part.

In different example embodiments, the security circuit 220 can be configured to enable neither the read access nor the read and write access in the event of a failed authentication. If necessary, the security circuit 220 can furthermore be configured to trigger an alarm, for example in the device, in the event of a failed authentication.

In different example embodiments, the security circuit 220 can be configured to take account of at least one additional parameter in the selection between the read access and the read and write access. The additional parameter can relate, for example, to a relevance of the read access or read/write access for an operational safety of the device, an operational state of the device and/or a time of provision of the certificate.

The consideration of the relevance of the read access or read/write access for the operational safety of the device can mean that the security circuit 220 is configured, in the selection between the read access and the read and write access (or the complete prohibition of access), to make a clear distinction between a debug instruction which may be critical for operational safety (e.g. "stop", "pause", etc.) and other debug instructions which have a monitoring function only (e.g. counting, tracking, etc.). The operational-safety-critical instructions may normally require a write access, whereas a read-only access may normally be sufficient for the monitoring functions. In some cases, for example during a readout of a memory (e.g. one of the memories 130) which is automatically overwritten after the readout, the read-only access can also be categorized, if necessary, as operational-safety-critical.

The consideration of the operational state of the device can mean that the security circuit 220 can be configured to completely prohibit the read and write access (or an operational-safety-critical read access) to all areas of the control circuit 102 or at least to one or more of the selected areas of the control circuit 102 if the device is in a first predefined operational state, and/or to enable read and write access (or an operational-safety-critical read access) to all areas 128, 130 of the control circuit 102 or at least to one or more of the selected areas 128, 130 of the control circuit 102 if the device is in a second predefined operational state.

The first predefined operational state may be an "active" operational state, in other words an operational state in which the device is active or in operation, for example a running engine, a diagnostic medical device during operation or the like.

The first predefined operational state may be an "inactive" operational state, in other words an operational state in which the device is inactive or is not in operation or is in an idle/paused state, for example a motor vehicle which is in a workshop for repair, or the like.

Different diagnostic modes can be created for the system-on-chip 200 on the basis of the criteria described above.

A "safe-enabled mode", for example, can be provided in which the access authorizations are set in such a way (only read authorizations, or even only those read authorizations in which an overwrite after the reading is excluded) that only a monitoring of states of the control circuit 102 of the device is possible.

Only an on-chip trace system (part of a diagnostic circuit (debug and trace system DTS 290) needs to be configured by means of write accesses if it is used in this mode. In this case, a configuration of the access-authorized master can be set, e.g. using the master tags, in such a way that the on-chip trace system is configurable only by the security circuit 220. It can thereby be or become ensured that the DTS 290 cannot be used by malware which is running, e.g. on one of the CPUs 128, in order to analyze the control circuit 102, and in particular the software and data, with the trace system.

A mode of this type could, for example, be or become set during the operation of the device. An access, for example by means of a cloud, can be used for a safe and secure remote diagnosis.

As a further example, a "privileged debug mode" can be provided in which, in addition to the read authorization, a write authorization can also be assigned to selected authorized parties only. A debug can thus also be or become enabled in addition to the monitoring of states of the control circuit 102 or the device, for example by individual access-authorized parties. A mode of this type could be or become set, for example during a test operation of the device. A secure (mainly secure in terms of information technology) remote debugging, for example, can be enabled with this or a similar mode, for example in the case of a direct access to a network of the device (e.g. a motor vehicle network).

During or after a manufacture of the SoC 200 and/or its connection to the device, it may be appropriate or necessary not to restrict the access authorizations. In a "setup mode" or "installation mode" of this type, an essentially unlimited read and write access to the control circuit 102 can be enabled.

The consideration of the time of provision of the certificate can enable the provision of certificates with a limited validity period, for example in order to be able to extract information for a limited time period after the manufacture or after a maintenance/repair operation.

The system-on-chip 200 can be configured to close the communication path following an instruction from the diagnostic system 104, the security circuit 220 and/or the control circuit 102. The system-on-chip 200 can furthermore be configured to perform a restart following the closure of the communication path.

According to different example embodiments, the system-on-chip 200 shown in FIG. 2B serves to illustrate that the security circuit 220 can access the entire chip and provides the secure communication path, i.e., for example, by means of a communication (COM) peripheral 140, e.g. via Ethernet. This means that the diagnostic system 104 (not shown) would be connected to the COM peripheral from outside the SoC 200 in FIG. 2B, in other words the CPU is capable of using any communication (COM) peripheral 140, e.g. the Ethernet, in order to communicate with the external host of the diagnostic system 104 as an analytical tool.

It is furthermore illustrated that the security circuit 220 provides the system (e.g. software, provided e.g. on the CPU or as part of a virtual machine) for the diagnostics of the control circuit 102. The diagnostic circuit 290 is denoted here as DTS. Even if special connections are shown in FIG. 2B between the security circuit 220 and the communication (COM) peripheral 140 on the one hand or the DTS 290 on the other hand, these data connections can also be provided by means of conventional on-chip buses or networks.

In this case, it must be or become ensured that the diagnostic circuit (DTS) 290 cannot be used by malware which is running e.g. on one of the CPUs 128. The configuration of the access-authorized masters must therefore allow the latter to be restricted to all masters which are trusted from a security perspective.

This trace system is then allowed to be configurable by the security circuit only. Malware which is running on any of the CPUs 128 could otherwise be used to analyze the control circuit, and, in particular, the software and data, with the trace system.

In summary, a system is provided in which software runs on a security CPU or a security virtual machine which communicates via a network with external tool software and controls diagnostic and debug hardware resources according to instructions from the external tool software. The communication can be protected, i.e., for example, authenticated and/or encrypted, in respect of its data security.

In different embodiments, the software can be configured to upload and/or download data (e.g. monitoring/tracking data), to set breakpoints and/or to configure a monitoring system.

In different example embodiments, different authorization levels can be agreed in advance and a scope of permitted actions can then be or become restricted according to the authorization level (e.g. by means of the security circuit 220).

A scope of permitted actions definable according to the authorization level can be used, for example as described above, to make a clear distinction between operational-safety-related debug actions (stop, pause, etc.) and other debug actions (counting, tracking, etc.).

In different example embodiments, a tracking system can be provided by means of the system-on-chip, said tracking system enabling a scope of actions and tracking operations to be restricted on a virtual machine level. This can mean, for example, that only the program trace and/or data trace is/are possible for a specific virtual machine.

In different example embodiments, a key used for authentication for the certificate can be modified statically or dynamically (e.g. according to a jointly agreed key distribution protocol).

On the one hand, since the diagnostic instructions are supplied to the control circuit by means of the security CPU 118 of the security circuit 220, no CPU provided specifically for this purpose is required. On the other hand, however, the security CPU 118 is independent from the CPUs 228 of the control circuit 102, so that all CPUs 128 can be stopped, if necessary, during the debugging without the diagnostic software failing as a result.

FIG. 3 shows a flow diagram 300 of a method for operating a system-on-chip according to different example embodiments.

The method entails controlling a device by means of a control circuit with a plurality of control circuit areas (at 310), providing a communication path for the secured communication between a security circuit and a diagnostic system disposed outside the security circuit, wherein the security circuit has a separately secured key memory and a hardware accelerator for cryptographic operations and is configured to provide the communication path for the secured communication by means of the key memory and the hardware accelerator (at 320), deciding whether a read access or read and write access is grantable to the at least one selected area of the control circuit depending on a certificate supplied to the security circuit and authenticated by means of information stored in the key memory (at 330), electively enabling the read-only access or the read and write access to at least one of the control circuit areas by means of the security circuit (at 340), and executing the read access or the read and write access (at 350).

Some example embodiments are indicated in summary below.

Example embodiment 1 is a system-on-chip. The system-on-chip can have a control circuit with a plurality of control circuit areas, wherein the control circuit is configured to control a device, a security circuit which has a separately secured key memory and a hardware accelerator for cryptographic operations, wherein the security circuit is configured to electively enable either a read-only access or a read and write access to at least one of the control circuit areas, wherein the security circuit is furthermore configured to provide a communication path by means of the key memory and the hardware accelerator for the secured communication with a diagnostic system disposed outside the security circuit, to make the selection between the read access and the read and write access to the at least one selected area of the control circuit depending on a certificate supplied to the security circuit and authenticated by means of information stored in the key memory, and to execute the read access or the read and write access.

Example embodiment 2 is a system-on-chip according to example embodiment 1, wherein the read access or read and write access to the at least one selected area of the control circuit is designed in such a way that at least one diagnostic instruction forwarded from the diagnostic system by means of the communication path to the security circuit is executable therewith.

Example embodiment 3 is a system-on-chip according to example embodiment 2, wherein the security circuit is configured by means of software to execute the secured communication and/or to supply the diagnostic instruction to the control circuit.

Example embodiment 4 is a system-on chip according to example embodiment 3, wherein the security circuit has a CPU or a virtual machine which is configured to run the software.

Example embodiment 5 is a system-on chip according to example embodiment 3 or 4, wherein the software has a software communication stack.

Example embodiment 6 is a system-on chip according to one of example embodiments 3 to 5, wherein the software has an Ethernet software communication stack.

Example embodiment 7 is a system-on chip according to one of example embodiments 4 to 6, wherein the CPU or the virtual machine is configured to support a plurality of master tags for access to the at least one selected area of the control circuit, wherein the selected area of the control circuit is configured to refuse or enable the access on the basis of the master tag.

Example embodiment 8 is a system-on chip according to one of the preceding embodiments, wherein the communication path entails a network.

Example embodiment 9 is a system-on-chip according to example embodiment 8, wherein the network at least partially entails a wireless data transmission.

Example embodiment 10 is a system-on-chip according to one of the preceding example embodiments, wherein the at least one selected area of the control circuit has a plurality of selected areas of the control circuit, and wherein the security circuit is configured to make the selection between the read access and the read and write access separately for each of the plurality of selected areas of the control circuit.

Example embodiment 11 is a system-on-chip according to one of the preceding example embodiments, wherein the security circuit is configured to enable neither the read access nor the read and write access in the event of a failed authentication.

Example embodiment 12 is a system-on-chip according to one of the preceding example embodiments, wherein the security circuit is configured to trigger an alarm in the event of a failed authentication.

Example embodiment 13 is a system-on-chip according to one of the preceding example embodiments, wherein the security circuit is configured to take account of at least one additional parameter in the selection between the read access and the read and write access.

Example embodiment 14 is a system-on-chip according to example embodiment 13, wherein the additional parameter relates to a relevance of the read access or read/write access for an operational safety of the device, an operational state of the device and/or a time of provision of the certificate.

Example embodiment 15 is a system-on-chip according to example embodiment 14, wherein the consideration of the operational state of the device means that the security circuit is configured to completely prohibit at least the read and write access to all areas of the control circuit or at least to one or more of the selected areas of the control circuit if the device is in a first predefined operational state, and/or to enable read and write access to all areas of the control circuit or at least to one or more of the selected areas of the control circuit if the device is in a second predefined operational state.

Example embodiment 16 is a system-on-chip according to example embodiment 15, wherein the first operational state is an "active and functionally safe" operational state.

Example embodiment 17 is a system-on-chip according to example embodiment 15, wherein the first operational state is an "active with restricted/without functional safety" operational state.

Example embodiment 18 is a system-on-chip according to one of the preceding example embodiments, wherein the security circuit is configured to make a distinction in the selection between the read access and the read and write access between an operational-safety-related read access or read and write access and a merely monitoring, non-operational-safety-related read access or read and write access.

Example embodiment 19 is a system-on-chip according to one of the preceding example embodiments, wherein the at least one selected area has a virtual machine and/or diagnostic hardware and/or debug hardware of the control circuit.

Example embodiment 20 is a system-on-chip according to example embodiment 19, wherein the diagnostic hardware and/or debug hardware is configurable in such a way that it is usable by the security circuit only.

Example embodiment 21 is a system-on-chip according to one of the preceding example embodiments which is furthermore configured to close the communication path following an instruction from the diagnostic system, the security circuit and/or the control circuit.

Example embodiment 22 is a method for operating a system-on-chip. The method entails controlling a device by means of a control circuit with a plurality of control circuit areas, providing a communication path for the secured communication between a security circuit and a diagnostic system disposed outside the security circuit, wherein the security circuit has a separately secured key memory and a hardware accelerator for cryptographic operations and is configured to provide the communication path for the secured communication by means of the key memory and the hardware accelerator, deciding whether a read access or read and write access is grantable to the at least one selected area of the control circuit depending on a certificate supplied to the security circuit and authenticated by means of information stored in the key memory, electively enabling the read-only access or the read and write access to at least one of the control circuit areas by means of the security circuit, and executing the read access or the read and write access.

Example embodiment 23 is a method according to example embodiment 22, wherein the read or the read and write access to the at least one selected area of the control circuit is designed in such a way that at least one diagnostic instruction forwarded from the diagnostic system by means of the communication path to the security circuit is executable therewith.

Example embodiment 24 is a method according to example embodiment 22 or 23, wherein the security circuit is configured by means of software to perform the secured communication.

Example embodiment 25 is a method according to example embodiment 24, wherein the security circuit has a CPU or a virtual machine which is configured to run the software.

Example embodiment 26 is a method according to example embodiment 24 or 25, wherein the software has a software communication stack.

Example embodiment 27 is a method according to one of example embodiments 24 to 26, wherein the software has an Ethernet software communication stack.

Example embodiment 28 is a method according to one of example embodiments 25 to 27, wherein the CPU or the virtual machine is configured to support a plurality of master tags for access to the at least one selected area of the control circuit, wherein the selected area of the control circuit is configured to refuse or enable the access on the basis of the master tag.

Example embodiment 29 is a method according to one of the preceding example embodiments, wherein the communication path entails a network.

Example embodiment 30 is a method according to example embodiment 29, wherein the network at least partially entails a wireless data transmission.

Example embodiment 31 is a method according to one of the preceding example embodiments, wherein the at least one selected area of the control circuit has a plurality of selected areas of the control circuit, and wherein the security circuit is configured to make the selection between the read access and the read and write access separately for each of the plurality of selected areas of the control circuit.

Example embodiment 32 is a method according to one of the preceding example embodiments, wherein the security circuit is furthermore configured to enable neither the read access nor the read and write access in the event of a failed authentication.

Example embodiment 33 is a method according to one of the preceding example embodiments, wherein the security circuit is configured to trigger an alarm in the event of a failed authentication.

Example embodiment 34 is a method according to one of the preceding example embodiments, wherein the security circuit is configured to take account of at least one additional parameter in the selection between the read access and the read and write access.

Example embodiment 35 is a method according to example embodiment 34, wherein the additional parameter relates to a relevance of the read access or read/write access for an operational safety of the device, an operational state of the device and/or a time of provision of the certificate.

Example embodiment 36 is a method according to example embodiment 35, wherein the consideration of the operational state of the device means that the security circuit is configured to completely prohibit at least the read and write access to all areas of the control circuit or at least to one or more of the selected areas of the control circuit if the device is in a first predefined operational state, and/or to enable read and write access to all areas of the control circuit or at least to one or more of the selected areas of the control circuit if the device is in a second predefined operational state.

Example embodiment 37 is a method according to example embodiment 36, wherein the first operational state is an "active and functionally safe" operational state.

Example embodiment 38 is a method according to example embodiment 36, wherein the first operational state is an "active with restricted/without functional safety" operational state.

Example embodiment 39 is a method according to one of the preceding example embodiments, wherein the security circuit is configured to make a distinction in the selection between the read access and the read and write access between an operational-safety-related read access or read and write access and a merely monitoring, non-operational-safety-related read access or read and write access.

Example embodiment 40 is a method according to one of the preceding example embodiments, wherein the at least one selected area has a virtual machine and/or diagnostic hardware and/or debug hardware of the control circuit, wherein the selected area of the control circuit is configured to refuse or enable the access on the basis of the master tag.

Example embodiment 41 is a method according to one of the preceding example embodiments which furthermore entails closing the communication path following an instruction from the diagnostic system, the security circuit and/or the control circuit.

The invention claimed is:

1. A system-on-chip, comprising:
a control circuit comprising a plurality of control circuit areas, wherein the control circuit is configured to control a device,
a security circuit comprising a separately secured key memory and at least one hardware accelerator configured to perform cryptographic operations,
wherein the security circuit is configured to selectively enable either a read-only access or a read and write access to at least one of the control circuit areas, and
wherein the security circuit is further configured to provide a communication path by means of the key memory and the at least one hardware accelerator for a secured communication with a diagnostic system disposed outside the security circuit, to make the selection between the read-only access and the read and write access to at least one selected area of the control circuit depending on a certificate supplied to the security circuit and authenticated by means of information stored in the key memory, and to execute the read-only access or the read and write access.

2. The system-on-chip as claimed in claim 1, wherein the read-only access or read and write access to the at least one selected area of the control circuit is configured so that at least one diagnostic instruction forwarded from the diagnostic system by means of the communication path to the security circuit is executable therewith.

3. The system-on-chip as claimed in claim 2, wherein the security circuit is configured by means of software to execute the secured communication and/or to supply the diagnostic instruction to the control circuit.

4. The system-on-chip as claimed in claim 3, wherein the security circuit comprises a CPU or a virtual machine which is configured to run the software.

5. The system-on-chip as claimed in claim 3, wherein the software comprises a software communication stack.

6. The system-on-chip as claimed in claim 3, wherein the software comprises an Ethernet software communication stack.

7. The system-on-chip as claimed in claim 4, wherein the CPU or the virtual machine is configured to support a plurality of master tags for access to the at least one selected area of the control circuit, wherein the selected area of the control circuit is configured to refuse or enable the access on the basis of one or more of the master tags.

8. The system-on-chip as claimed in claim 1, wherein the communication path comprises a network.

9. The system-on-chip as claimed in claim 8, wherein the network at least partially comprises a wireless data transmission.

10. The system-on-chip as claimed in claim 1, wherein the at least one selected area of the control circuit has a plurality of selected areas of the control circuit, and wherein the security circuit is configured to make the selection between the read-only access and the read and write access separately for each of the plurality of selected areas of the control circuit.

11. The system-on-chip as claimed in claim 1, wherein the security circuit is configured to enable neither the read-only access nor the read and write access in the event of a failed authentication.

12. The system-on-chip as claimed in claim 1, wherein the security circuit is configured to trigger an alarm in the event of a failed authentication.

13. The system-on-chip as claimed in claim 1, wherein the security circuit is configured to take account of at least one additional parameter in the selection between the read-only access and the read and write access.

14. The system-on-chip as claimed in claim 13, wherein the additional parameter relates to a relevance of the read-only access or read and write access for an operational safety of the device, an operational state of the device, and/or a time of provision of the certificate.

15. The system-on-chip as claimed in claim 14, wherein the relevance of the operational state of the device means that the security circuit is configured to completely prohibit at least the read and write access to all areas of the control circuit or at least to one or more of the selected areas of the control circuit when the device is in a first predefined operational state, and/or to enable read and write access to all areas of the control circuit or at least to one or more of the selected areas of the control circuit when the device is in a second predefined operational state.

16. The system-on-chip as claimed in claim 15, wherein the first predefined operational state is an active and functionally safe operational state.

17. The system-on-chip as claimed in claim 15, wherein the first operational state is an active with restricted/without functional safety operational state.

18. The system-on-chip as claimed in claim 1, wherein the security circuit is configured to make a distinction in the selection between the read-only access and the read and write access between an operational-safety-related read-only access or read and write access and a merely monitoring, non-operational-safety-related read-only access or read and write access.

19. The system-on-chip as claimed in claim 1, wherein the at least one selected area comprises a virtual machine and/or diagnostic hardware and/or debug hardware of the control circuit.

20. The system-on-chip as claimed in claim 19, wherein the diagnostic hardware and/or debug hardware is configurable so that it is usable by the security circuit only.

21. The system-on-chip as claimed in claim 1, which is further configured to close the communication path following an instruction from the diagnostic system, the security circuit, and/or the control circuit.

* * * * *